(12) United States Patent
Kicklighter et al.

(10) Patent No.: US 11,718,559 B2
(45) Date of Patent: Aug. 8, 2023

(54) CLOSED LOOP CONTROL WITH CAMERA DETECTION OF PEBBLE SIZE OF LIME PARTICLES TO AMELIORATE LIME KILN RINGING AND IMPROVE UPTIME AND OPERATING EFFICIENCY

(71) Applicant: GPCP IP Holdings LLC, Atlanta, GA (US)

(72) Inventors: Thomas Kicklighter, St. Augustine, FL (US); Bala Panchapakesan, Alpharetta, GA (US)

(73) Assignee: GPCP IP HOLDINGS LLC, Atlanta, GA (US)

( * ) Notice: Subject to any disclaimer, the term of this patent is extended or adjusted under 35 U.S.C. 154(b) by 336 days.

(21) Appl. No.: 16/800,703

(22) Filed: Feb. 25, 2020

(65) Prior Publication Data

US 2020/0290924 A1 Sep. 17, 2020

Related U.S. Application Data

(60) Provisional application No. 62/818,957, filed on Mar. 15, 2019.

(51) Int. Cl.
*C04B 2/10* (2006.01)
*F27B 1/00* (2006.01)
(Continued)

(52) U.S. Cl.
CPC .............. *C04B 2/108* (2013.01); *F27B 1/005* (2013.01); *F27D 19/00* (2013.01); *F27D 21/02* (2013.01);
(Continued)

(58) Field of Classification Search
None
See application file for complete search history.

(56) References Cited

U.S. PATENT DOCUMENTS 4,759,033 A * 7/1988 Ariessohn .............. G01K 13/02
374/161
5,597,445 A 1/1997 Westerberg
(Continued)

FOREIGN PATENT DOCUMENTS

CN 1116828 A 2/1996
CN 108358610 A * 8/2018 ......... C04B 33/1321
(Continued)

OTHER PUBLICATIONS

English translation of DE 19950981 B4 (Year: 2008).*
(Continued)

*Primary Examiner* — Steven S Anderson, II
*Assistant Examiner* — Kurt J Wolford

(57) ABSTRACT

An improved lime mud recycling system including a camera proximate the kiln outlet imaging the granular lime and providing outlet images of the granular lime exiting the kiln, a processor analyzing the outlet images of the granular lime and providing pebble size distributions for the granular lime exiting the kiln, as well as a controller communicating with the processor comparing the pebble size distribution of the granular lime exiting the kiln with predetermined prescribed operating parameters for pebble size distributions for the granular lime exiting the kiln and issuing (I) a notification and/or (II) a control signal prompting remedial action when the pebble size distributions for the granular lime exiting the kiln are outside of the predetermined prescribed operating parameters.

10 Claims, 2 Drawing Sheets

(51) Int. Cl.
*F27D 21/02* (2006.01)
*F27D 19/00* (2006.01)

(52) U.S. Cl.
CPC ............... *F27D 2019/0003* (2013.01); *F27D 2021/026* (2013.01)

(56) References Cited

U.S. PATENT DOCUMENTS

| | | | |
|---|---|---|---|
| 5,989,018 | A | 11/1999 | Ahvenainen |
| 6,451,164 | B1 | 9/2002 | Croft |
| 6,710,874 | B2 | 3/2004 | Mavliev |
| 7,374,688 | B2 | 5/2008 | Banerjee |
| 7,628,964 | B2 | 12/2009 | Leichliter, III |
| 7,724,367 | B2 | 5/2010 | Cole |
| 7,906,086 | B2 | 3/2011 | Comrie |
| 8,506,916 | B2 | 8/2013 | Comrie |
| 8,571,715 | B2 | 10/2013 | Runkana et al. |
| 10,011,948 | B2 | 7/2018 | Ruef et al. |
| 2012/0143377 | A1 | 6/2012 | Ledung et al. |
| 2016/0207778 | A1 | 7/2016 | Rossi |
| 2017/0183237 | A1 | 6/2017 | Vandendoren |
| 2017/0191919 | A1 | 7/2017 | Kulkarni et al. |
| 2019/0093950 | A1 | 3/2019 | Peltonen |

FOREIGN PATENT DOCUMENTS

| | | | | |
|---|---|---|---|---|
| CN | 109405533 A | * | 3/2019 | ................ F27B 7/12 |
| DE | 19950981 B4 | * | 1/2008 | ................ F27B 7/42 |
| DE | 102017202824 A1 | * | 8/2018 | ............. C04B 7/361 |
| GB | 2555377 A | * | 5/2018 | ............. F27D 21/02 |
| JP | H07196347 A | | 8/1995 | |
| SE | 523619 C2 | | 5/2004 | |
| WO | 2008052542 A1 | | 5/2008 | |
| WO | WO-2011000430 A1 | * | 1/2011 | ............... C04B 2/10 |
| WO | WO-2018107663 A1 | * | 6/2018 | ............. C10B 27/06 |

OTHER PUBLICATIONS

Sympatec (Year: 2017).*
Horiba (Year: 2018).*
Control Engineering (Year: 2010).*
Dynamic Image Analysis II (Year: 2017).*
Image Analysis (Year: 2017).*
English translation of CN-109405533-A (Year: 2019).*
English translation of CN-108358610-A (Year: 2018).*
English translation of WO-2018107663-A1 (Year: 2018).*
Accessibility Dates of NPL references (Year: 2021).*
Dictionary definition of "in situ" (Year: 2022).*
Sympatec, Dynamic Image Analysis (Year: 2017).*
Control Engineering, What's the problem with overshoot? (Year: 2010).*
Horiba, Understanding and Interpreting Particle Size Distribution Calculations (Year: 2009).*
DE-102017202824-A1 English translation (Year: 2018).*
International Search Report and Written Opinion dated Jun. 23, 2020.
Tran, "Lime Kiln Chemistry and Effects on Kiln Operations", Tappi Kraft Recovery; Short Course, 2007, pp. 2.3-1-2.3-9, Tappi Press.
Extended European Search Report received for application No. 20773610.9 dated Aug. 16, 2022, 11 pages.

* cited by examiner

CLOSED LOOP CONTROL WITH CAMERA DETECTION OF PEBBLE SIZE OF LIME PARTICLES TO AMELIORATE LIME KILN RINGING AND IMPROVE UPTIME AND OPERATING EFFICIENCY

CLAIM FOR PRIORITY

This Patent Application is based on U.S. Provisional Patent Application Ser. No. 62/818,957, filed Mar. 15, 2019 of the same title and the priority of which is claimed. The disclosure of U.S. Provisional Patent Application Ser. No. 62/818,957 is hereby incorporated herein by reference in its entirety.

TECHNICAL FIELD

The present invention relates to operating a lime kiln with in situ detection of pebble size and remedial action based on the pebble size distribution in order to reduce lime kiln ringing and ball formation.

BACKGROUND

Tran, Honghi, "Lime Kiln Chemistry and Effects on Kiln Operations", Tappi Kraft Recovery; Short Course, Tappi Press, pp 2.3-1-2.3-9 (2007) discusses the chemistry associated with the use of lime kilns to convert lime mud, primarily calcium carbonate, into lime (CaO) for re-use in the causticizing plant of a Kraft recovery process, along with operating problems such as kiln ringing, ball formation, dusting, sulphur emissions and refractory brick thinning. The composition of lime mud varies from mill to mill, with sodium (oxide) typically being the most prevalent impurity. The production of good quality reburned lime is the most basic requirement of lime kiln operation. Typically, good quality reburned lime is in the form of nodule (round pellets) with small nodules causing dusting problems and large balls having an un-calcined core containing carbonates. The quality of reburned lime is generally judged by its residual carbonate content, as well as CaO availability and reactivity. Lime availability is the amount of CaO present in the reburned lime. Lime reactivity refers to the speed at which lime can be slaked in a slaker in connection with recausti-fication. A highly reactive lime has a porous structure and will typically slake within five (5) minutes. A low reactivity lime usually has low CaO availability and a low specific surface area and may take 15 to 20 minutes to slake, causing operating problems in slakers and causticizers.

Ring formation in the kiln is a complex process wherein lime mud deposits adhere to the kiln wall and harden, probably mostly because of re-carbonation. Ringing is the most troublesome problem in lime kiln operation. In severe cases, ringing results in unscheduled shutdowns for ring removal.

U.S. Pat. No. 6,451,164 to Croft discloses and claims alkyleneamine compositions for enhancing lime mud dewatering. The alkyleneamine is added to the lime mud prior to filtration. The main benefit asserted is the reduction of water content in the lime mud exiting the filter. Additional benefits may include reduction in formation of rings and balls according to the disclosure.

The use of lime and reprocessing lime mud from a Kraft process is known in the art. For example, specific reference to lime kiln operation and systems in connection with paper mills is seen in U.S. Pat. No. 4,759,033 to Ariessohn, U.S. Pat. No. 5,597,445 to Westerberg and U.S. Pat. No. 5,989,018 to Ahvenainen. So also, U.S. Pat. No. 7,628,964 to Leichliter discloses a method and apparatus for pre-treating lime mud prior to calcining with hot flue gas. See Abstract.

More generally, U.S. Pat. No. 8,506,916 to Comrie discloses a system for reducing emissions of sulfur compounds from lime kilns and the like using a packed bed of dry solid material. U.S. Pat. No. 7,906,086 to Comrie relates to scrubbing carbon dioxide from industrial effluents. Among the scrubbing materials enumerated are CaO in the form of lime kiln dust (LKD) which is carbonated by carbon dioxide into calcium carbonate. See Col. 21, lines 36-51. U.S. Pat. No. 7,374,688 to Banerjee discloses a method of enhancing sludge dewatering by treatment with electrical sparks. U.S. Pat. No. 10,011,948 to Ruef et al. discloses a process for recausticizing green liquor in a sulphate or Kraft process, including treatment with carbon dioxide.

Feedback or closed loop control systems and particle size analyzers are likewise known in the art.

Regarding closed loop control, United States Patent Publication No. US 2017/0191919 of Kulkarni et al. discloses real time optical flow imaging to determine particle size distribution in a well-bore fluid for oil and gas recovery. The particle size distribution of particulate material in the well-bore fluid is monitored and particulates are replenished, as needed. U.S. Pat. No. 8,571,715 to Runkana et al. discloses a system for optimizing operation of an induration furnace in real time. Among the process parameters are wet iron ore pellet properties such as particle size distributions of coal, coke and limestone, gas stream temperatures and so forth. See Col. 9, lines 4-22.

Regarding particle size analysis per se, U.S. Pat. No. 7,724,367 to Cole relates to a particle size analyzer for smoke detection and the like, while U.S. Pat. No. 6,710,874 to Mavliev relates to a method and apparatus for measuring particles in a flowing system.

Existing feedback control systems and particle size analyzers, however, are inadequate to provide effective control methodology for lime kilns because of the high temperatures involved, the complexity of the process and the relatively large size of the pebbles formed, as well as instability of lime nodules that degrade rapidly in the presence of moisture, making sampling difficult and analysis even more challenging.

Existing methodology to correct lime kiln ringing and ball formation in lime kilns is manually undertaken and largely ineffective.

SUMMARY OF INVENTION

The present invention is directed, in one aspect, to a system for recycling lime mud having closed loop control for ameliorating kiln ringing and ball formation with camera detection of pebble size. The system includes a lime kiln with a lime mud inlet, a reburned lime outlet and a burner to heat the kiln; and a lime mud feed system adapted to wash, filter and feed lime mud to the lime mud inlet of the kiln, wherein the kiln is adapted to heat the lime mud and convert the lime mud to lime in granular form (calcination process) while advancing the feed toward the reburned lime outlet of the kiln where the lime in granular form exits the kiln.

A camera adapted to image the lime in granular form proximate the reburned lime outlet of the kiln continuously provides in situ outlet images of the lime in granular form as it exits the kiln, while an analyzer coupled with or integral to the camera analyzes the outlet images of the lime to provide pebble size distributions for the granular lime exiting the kiln. A controller communicating with the analyzer operates to: (I) compare the pebble size distributions of the granular lime exiting the kiln with predetermined prescribed operating parameters for pebble size distributions of granular lime exiting the kiln; and (II) issue a notification and/or control signals when the pebble size distribution(s) of the granular line exiting the kiln is outside of the predetermined prescribed operating parameters for the pebble size distributions for granular lime exiting the kiln. Predetermined prescribed operating parameters for the pebble size distributions for granular lime exiting the kiln may include size distribution values for the pebble size distributions of granular lime exiting the kiln or rate values corresponding to changes in size distribution values for pebble size distributions of granular lime exiting the kiln.

Remedial action to correct operation is based on the notifications and control signals issued by the controller when the pebble size of the granular lime exiting the kiln is outside of the pre-set parameters. Corrections may be automatic or semi-automatic guided by notifications from the controller.

Further features and advantages of the invention will become apparent from the discussion which follows.

BRIEF DESCRIPTION OF DRAWINGS

The invention is described in detail below with reference to the various Figures, wherein like numerals indicate similar parts and wherein.

DETAILED DESCRIPTION

Figure 1:
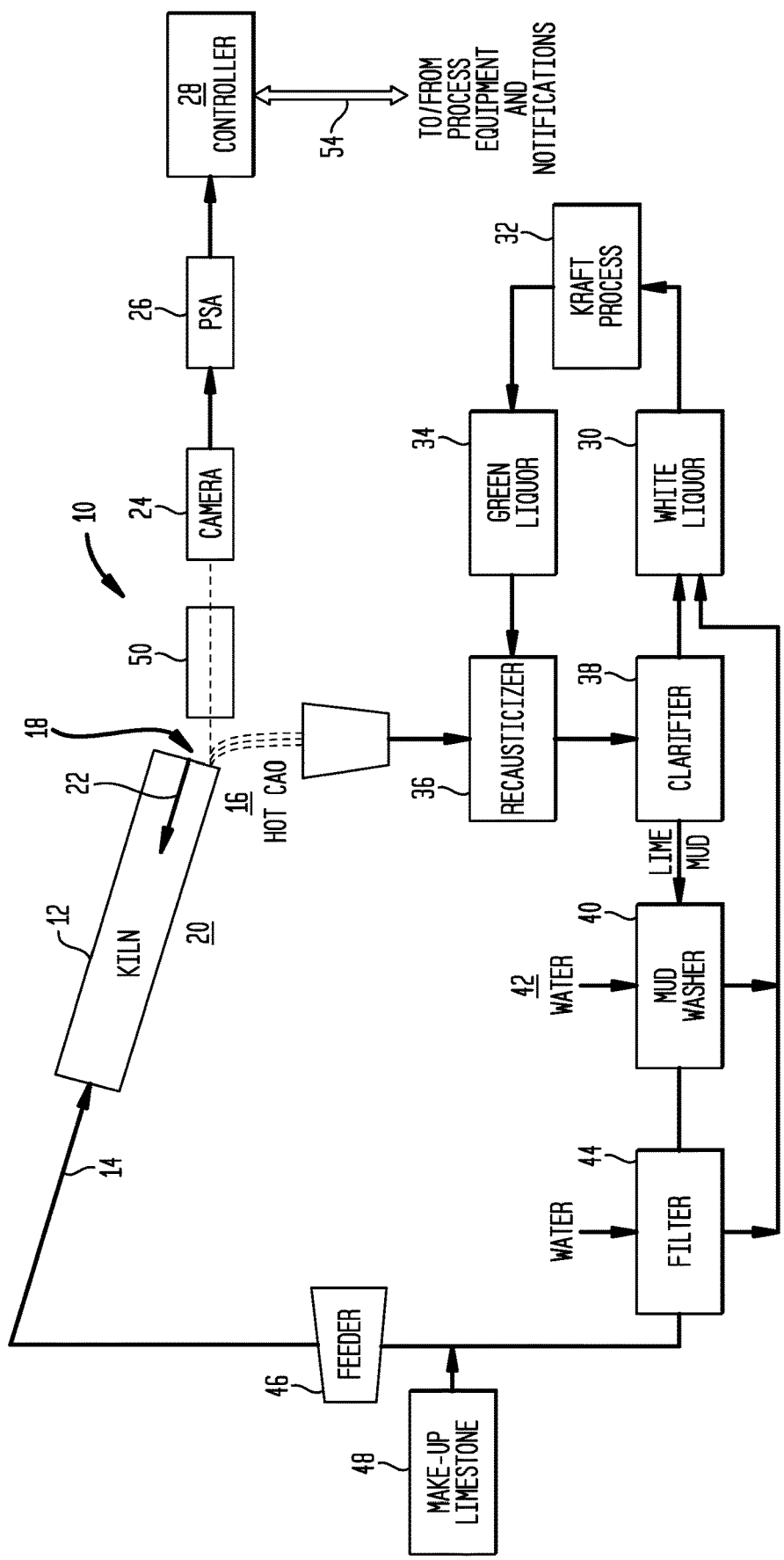
FIG. 1 is a schematic diagram of a system arranged in accordance with the present invention for recycling lime mud through a kiln in connection with a papermaking process including a Kraft pulping process.

The invention is described in detail below with reference to the Figures. Such discussion is for purposes of illustration, only. The invention is illustrated in connection with recycling of lime mud in a paper mill; however, the lime kiln may likewise be operated with fresh limestone slurry in a different setting. Modifications within the spirit and scope of the present invention, set forth in the appended claims, will be readily apparent to those of skill in the art. Terminology used throughout the specification and claims herein is given its ordinary meaning. Unless otherwise indicated, percent, % and like terminology refers to weight percent. Terminology is further defined below.

A "ball" refers to a large nodule formed in the lime kiln, greater than 30 mm in pebble size and typically greater than 50 mm in pebble size.

"Consistency" of a slurry refers to weight percent solids in the slurry.

"Lime" means quicklime consisting mostly of calcium oxide.

"Lime mud" and like terminology means a slurry consisting mostly of calcium carbonate. A lime mud slurry refers to a slurry containing converted lime coming out of the recausticizer where the calcium oxide from the lime kiln product stream is converted back to calcium carbonate by a reaction known as causticizing (calcium hydroxide reacts with sodium carbonate to give calcium carbonate). The lime mud slurry may have contaminants such as sodium carbonate, sodium hydroxide and some low levels of magnesium and other trace elements that circulate in the system.

A "notification" means a message generated and sent by the control system of the present invention which may be in the form of an audible alarm or an electronic message with remedial instructions to a computer, tablet, a hand held device or the like.

A "kiln parameter" refers to operating parameters of the kiln such as temperature, rotational speed of the kiln and air and fuel feed rate to the kiln, exhaust flue gas temperature, total reduced sulfur (TRS) emissions and so forth.

A "feed parameter" refers to other operating parameters of the system which relate to calcium carbonate feed to the kiln, such as lime mud or calcium carbonate slurry feed rate, mud or slurry density or consistency, make-up limestone feed rate, water shower flow and temperature in the mud washer, mud filter water flow and conductivity or pH of the mud filtrate from the filter, mud or slurry consistency fed to the kiln, sodium and other impurity levels, as well as lime feed rate to the slakers and recaustification and so forth.

Kiln and feed parameters are adjusted by making manual, semi-automated or fully automated remedial actions based on the pebble size distribution of lime exiting the kiln. Remedial action may be by direct adjustment of a kiln or feed parameter or by adjusting incoming feed flow, consistency, quality of lime or a control setting which, in turn, adjusts a given parameter.

"Pebble size" refers to the diameter of lime containing nodules formed in the lime kiln. For non-spherical particles, pebble size refers to the equivalent spherical diameter of a spherical nodule having like volume or like projected area. The pebble size diameter of a non-spherical pebble may thus be calculated as the square root of 4 times its projected area divided by π, that is:

$$\sqrt{\frac{4A}{\pi}},$$

where A is the projected area.

When we refer to comparing the pebble size distribution (s) of the granular lime exiting the kiln to predetermined prescribed operating parameters for pebble size distributions of granular lime exiting the kiln, we refer to comparing the size distribution data collected in situ to predetermined size distribution values or predetermined rate values corresponding to changes in size distribution values. In the former mode of analysis, the weight percent of a particular size or sizes of the pebble size distribution of the granular lime exiting the kiln is compared to predetermined values of desirable weight percent for a particular size or sizes. In this mode of operation, for example, we may specify that notifications be issued by the system for remedial action or automatic remedial action be undertaken by the system when 10% or more by weight of granulated lime exiting the kiln has a pebble size of 30 mm more. In the latter mode of analysis, we compare the rate of change of the percent of a particular size or sizes of the pebble size distributions of the granular lime exiting the kiln to a specific predetermined rate value. That is, in this mode of operation, the pebble size distributions of granular lime exiting the kiln is are monitored, and when the rate of change of a pebble size fraction exceeds a specific predetermined rate value, we specify that notifications be issued by the system for remedial action or automatic remedial action be undertaken by the system; for example, the predetermined rate values corresponding to changes in size distribution values for pebble size distribution of granular lime exiting the kiln may require that the increases in the rate of formation of pebbles having a pebble size of 30 mm or more are below a threshold value of 1% by weight additional pebbles having a pebble size of 30 mm or more per 24 hours and if outside the predetermined rate value, the controller issues a notification and/or a control signal. The system may be programmed to concurrently employ both methods of analysis if so desired.

When we refer to the camera adapted to image the lime in granular form proximate the reburned lime outlet of the kiln and like terminology, the imaging takes place as the lime exits the kiln and before the lime enters the next piece of processing equipment, for example, re-causticizer 36, FIG. 1. Commercial lime kilns are quite large; they may have a length of 275 ft (84 m) or so and a diameter of 12 feet (3.7 m) or so and may be adapted to process 350 metric tons of lime or more per day. The camera may optionally be adjustably disposed a distance from 0.5-2 feet (0.15-0.6 m) or so from the kiln outlet to image the lime anywhere from 1-25 ft (0.3-7.6 m) inside the kiln, after the feed has traversed 90% or so of the length of the kiln or a like distance after it exits the kiln and before further processing.

A "slurry" refers to a slurry of mineral solids in water unless otherwise indicated.

A kiln system 10 with camera detection in accordance with the invention is shown schematically in FIG. 1. System 10 includes a countercurrent, inclined rotary kiln 12 having a lime mud inlet 14, a lime outlet 16, temperature measurement indicated at 18, a rotary drive indicated at 20 and a burner indicated at 22. Burner 22 is typically a gas or oil fired burner. Located proximate kiln outlet 16 is a camera 24 for imaging the pebble size of the reburned lime exiting the kiln, providing continuous in situ information on the product at temperatures typically exceeding 1700° F. (927° C.).

Figure 2:
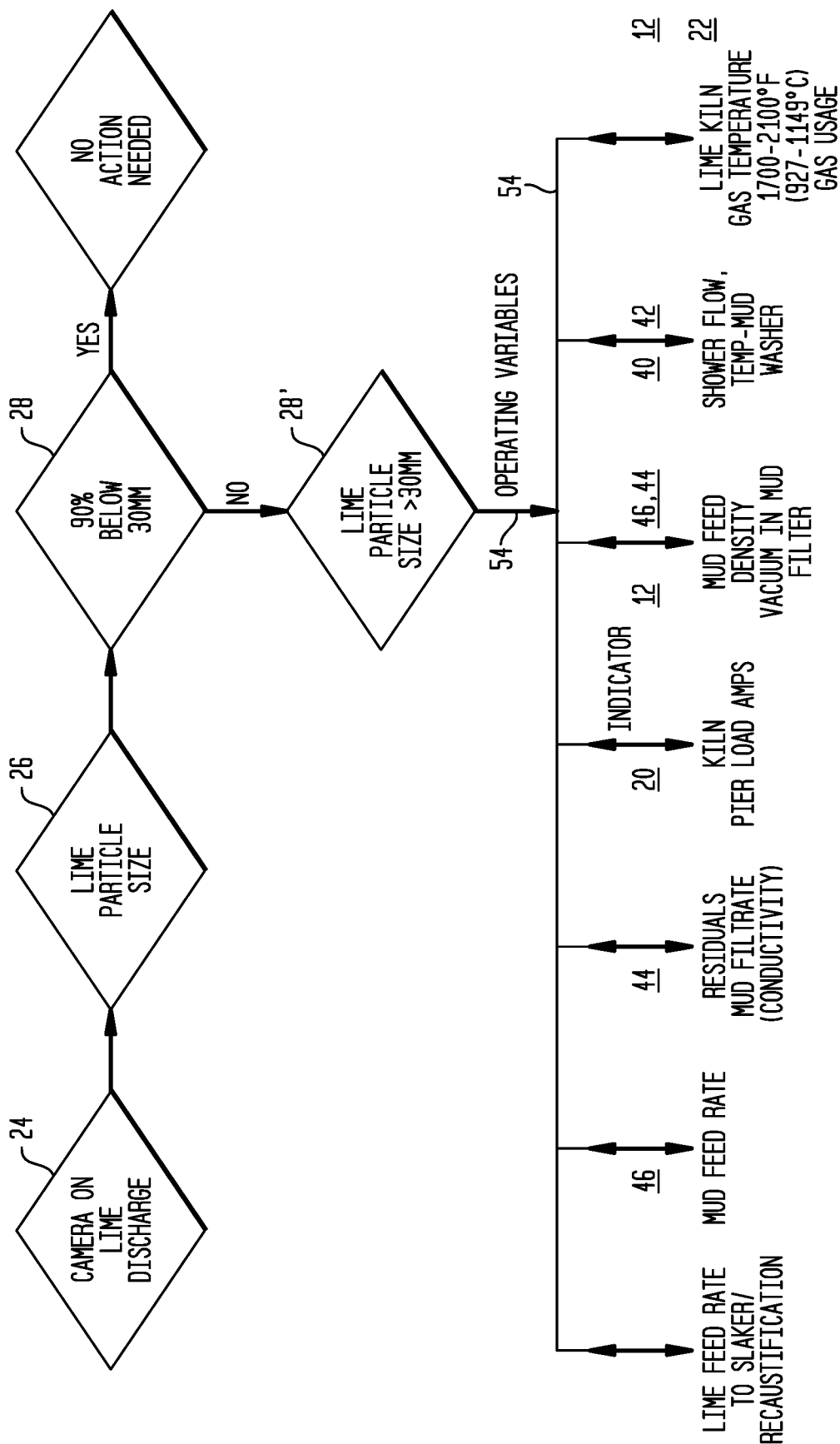
FIG. 2 is a schematic diagram illustrating control and operation of the system of FIG. 1.

Camera 24 is coupled with (or includes) one or more processors 26 which analyze the image of the pebbles exiting kiln 12 in order to determine the in situ pebble size distribution of the lime exiting the kiln, indicated as PSA on FIG. 1; which may be referred to as an analyzer. The analyzer is also coupled to, or integral with the camera or a controller 28 which provides notifications or control signals for system 10, as is seen in FIG. 2, hereinafter described.

System 10 is preferably integrated with paper mill operations, as shown in FIG. 1, for recycling lime mud in connection with pulp manufacture. The system is illustrated with a Kraft process, including a white liquor feed 30 to the Kraft process indicated at 32, a green liquor outlet indicated at 34 and a re-causticizer indicated at 36 where lime (CaO) is slaked and used to causticize sodium carbonate in the green liquor to sodium hydroxide and calcium carbonate.

The re-causticizer feeds a clarifier or settling tank 38 where the calcium carbonate is precipitated to provide lime mud and the sodium hydroxide is returned to the Kraft process.

Further provided is a mud washer 40 provided with a shower indicated at 42, a filter system indicated at 44, a mud feeder indicated at 46 and make-up lime feed indicated at 48. These components (38-48) make up the lime mud feed system in the embodiment illustrated in FIG. 1.

Inasmuch as the kiln operates at high temperature, on the order of 1800° F.-2000° F. (982° C.-1093° C.), camera 24 is preferably isolated or spaced from the shell of kiln 12 and provided with a cooling fan or optionally a cooled observation tube 50 to prevent damage to the camera.

In operation, recycled lime mud from feeder 46 is provided to kiln 12 at inlet 14 where the lime mud ($CaCO_3$) is converted to reburned lime (CaO) while flowing through kiln 12 under gravity while the kiln rotates to form lime pebbles or nodules, which are fed to the re-causticizer where the lime pebbles are slaked and then converted back to calcium carbonate. The calcium carbonate is recycled through system 10 as shown; that is, from the recausticizer to clarifier 38 where the calcium carbonate is precipitated to mud wash 40, then to filter system 44 and mud feeder 46. Make-up limestone is added by a feeder at 48, as needed, to fulfill mill requirements.

Kiln 12 is operated to optimize quality of the reburned lime; that is, with relatively low calcium carbonate content, as well as CaO availability and reactivity. Nodule size is indicative of quality, as well as indicative of optimal operation of the kiln. The overall process in a paper mill is relatively complex and exceedingly difficult to optimize; indeed, difficult to operate, at all, without numerous unscheduled shutdowns due to lime kiln ringing and formation of large soda balls which contain high levels of calcium carbonate. If the lime mud recycling is of poor quality, unscheduled shutdowns become frequent and large amounts of make-up limestone are required. Shutdowns and high levels of limestone make-up negatively impact mill operation productivity and profitability.

Among preferred parameters for the lime product exiting the kiln is a residual carbonate content of 3% or less, usually in the range of 2-3%, and lime availability of 86% plus. Soda in the lime mud should be less than 0.3% measured as $Na_2O$ because high soda levels result in the formation of rings and balls in the kiln. Kiln rotational speed is important for making appropriately sized pebbles, reducing dust entrainment into flue gas; a rotational speed of the bed of about 1.5 RPM provides suitable nodulization under most optimal conditions which improves energy efficiency.

The present invention provides for controlling the lime mud recycling process with closed loop control based on camera detection of pebble size of lime particles exiting the kiln. While lime mud varies over time and from mill to mill, lime particles exiting the kiln are generally of relatively poor quality when 5-10% by weight of the particles are larger than a threshold value of 30-50 mm or so. The present invention monitors the pebble size distributions exiting the kiln, preferably continuously and in real time, and notifies the operator and/or automatically takes remedial action when the pebble size distributions for the granular lime exiting the kiln is outside of the predetermined prescribed operating parameters provided to the system. For example, prescribed operating parameters for the pebble size distribution exiting the kiln may require that 90 wt. % of the pebbles be smaller than 30 mm. A pebble size distribution measured on the granular lime exiting the kiln with 15 wt. % of pebbles larger than 30 mm will trigger the controller to issue one or more notifications and in a preferred embodiment prompt automatic remedial action as described herein.

While automated response to off-spec product exiting the kiln is preferred, any of the remedial actions undertaken may be performed manually or semi-automatically, as well, based on notifications sent by the controller, which may include instructions for remedial actions to restore proper operation.

Typically, the camera and processors continuously analyze kiln output for pebble size to provide a pebble size distribution, for example, by weight (or volume) fraction in the following size ranges:

0-20 mm
20-35 mm
35–minus 50 mm
50-70 mm
70-90 mm
>90 mm

In one preferred embodiment, the one or more processors 26 are programmed to provide real time pebble size distribution information to controller 28 which, in turn, processes the information from the camera along with operating information from the various components received from an operating bus 54 and provides control signals to the process equipment and/or notifications to operators over bus 54, as described below.

Controller 28 continuously monitors the in situ pebble size distribution data provided by way of camera 24 and the analyzer (PSA). When the particle size distribution parameters are within pre-set limits, no action is taken. If the particle size distributions of the lime nodules exiting the kiln are outside of predetermined prescribed operating parameters, that is, pre-set or previously calculated limits, remedial action can be taken automatically by the controller, as described in connection with FIG. 2, which is a schematic diagram of the control logic and control system used to control lime mud processing system 10 of FIG. 1 when particle size distribution values are used to operate the inventive system.

The information is processed and if the pebble size distribution is within prescribed limits, for example, >90% of the pebbles are smaller than 30 mm, no notifications are sent and no remedial action is taken, as indicated in FIG. 2.

The various components of system 10 are provided with various features which communicate with controller 28 and enable controller 28 to take remedial action (indicated at 28') and/or notify an operator who can manually make adjustments to the system.

Lime Kiln

Kiln 12 is provided with temperature sensors which provide controller 28 with kiln temperature data, air and fuel flowmeters and flow controls which communicate with the controller which may automatically adjust fuel flow to adjust temperature, as necessary. The kiln also has an amp meter to gauge power to the rotary drive of the kiln. The controller can increase or decrease rotation of the kiln, as necessary, by increasing/decreasing power to the kiln drive, as required.

Mud Washer

Mud washer 40 has sensors which monitor shower water flow and temperature, as well as shower flow controls and heaters. The controller analyzes information and can change flow to the shower or adjust temperature, as may be required to adjust mud moisture over bus 54.

Filter

Filter system 44 is equipped with conductivity or pH sensors on the filtrate which provides the information to controller 28 over bus 54. Water flow may be adjusted to achieve desired conductivity in the filtrate which correlates to sodium content of the mud. Water flow through the filter system may also influence mud consistency which impacts processing.

Mud Feeder

The mud feeder has density, vacuum and flow sensors communicating with controller 28 over bus 54, as well as an adjustable feeder and water and vacuum inlets which allow controller 28 to adjust mud feed density by adding water and applying vacuum. Feed rate to the kiln is adjustable.

Additional features may be included, as desired, such as overall throughput control, make-up limestone feed and so forth, as may be expedient in operating system 10.

If the pebble size distribution is outside of prescribed operating values, the controller issues notifications to operators and preferably control commands to one or more of kiln 12, mud washer 40, filter system 44, mud feeder 46 and make-up limestone feeder 48 over bus 54.

Notifications may be in the form of audible alarms, flashing notifications on a display screen or other format and sent to a computer, tablet, handheld device and so forth. The notifications may include a detailed list of remedial actions to be undertaken to resolve the operating issues. Remedial actions to adjust kiln or feed parameters can be undertaken by the operator manually or automatically by the controller.

Remedial Actions

When the pebble size exiting the kiln is outside of the predetermined prescribed operating values, the controller issues one or more notifications and/or control signals to prompt remedial action including, without limitation, any of the following remedial actions.

A. Kiln adjustments—kiln operation may be adjusted by increasing kiln temperature by way of increasing fuel and air flow. Increasing temperature will help to maintain throughput. Alternatively, or in addition, kiln rotation speed may be increased by providing more power to the kiln drive which will increase rotational speed which will support transfer of hardened large size pebbles better, temporarily, until operating issues are corrected.

B. Mud washer adjustments—shower flow and water temperature in the mud washer can be increased to remove soluble impurities which will reduce ringing and ball formation and will enable returning to the target pebble size.

C. Filter adjustments—mud filtrate is monitored for conductivity and/or pH and water flow in the filter is increased to reduce impurity levels in the mud and decrease potential for ringing.

D. Mud feeder adjustments—when the pebble size exiting the kiln is outside of the prescribed operating values, mud feed density can be adjusted by adding water throughout the system, especially in the filter system. Adjusting vacuum in the mud filter will enable improved mud solids. The mud feed rate can be reduced, as well, in order to reduce ringing and ball formation, as required.

The invention utilizes continuous data analysis and real time data to prevent potential operating issues that conventionally include frequent operator intervention and, in the process, delays quick response to kiln operating issues. The invention enables immediate recognition of operating issues and provides tools to resolve the issues to minimize/eliminate loss in production or unplanned events. These losses can be significant in terms of lost uptime and cost involved in brining fresh lime and creating more instability in the process system. A typical economic gain per kiln, per year, in connection with the present invention is estimated to be about five hundred thousand dollars ($500,000.00).

Summary of Certain Preferred Embodiments

There is thus provided in accordance with the present invention various embodiments, wherein Embodiment No. 1 is a system for recycling lime mud having closed loop control for ameliorating kiln ringing and ball formation with camera detection of pebble size comprising: (a) a lime kiln with a lime mud inlet, a reburned lime outlet and a burner to heat the kiln; (b) a lime mud feed system adapted to wash, filter and feed lime mud to the lime mud inlet of the kiln, the kiln being adapted to heat the lime mud and convert the lime mud to lime in granular form while advancing the feed toward the reburned lime outlet of the kiln where lime in granular form exits the kiln; (c) a camera adapted to image the lime in granular form proximate the reburned lime outlet of the kiln to provide outlet images of lime in granular form as it exits the kiln; (d) an analyzer coupled with the camera adapted to analyze the outlet images of the lime in granular form as it exits the kiln to provide pebble size distributions for the granular lime exiting the kiln; and (e) a controller communicating with the analyzer operative to: (I) compare the pebble size distributions of the granular lime exiting the kiln with predetermined prescribed operating parameters for pebble size distribution of granular lime exiting the kiln and (II) issue a notification and/or a control signal when the pebble size distributions of granular line exiting the kiln are outside of the predetermined prescribed operating parameters for pebble size distributions for granular lime exiting the kiln.

Embodiment No. 2 is an improvement in a paper mill with a re-causticizer feeding a lime mud recycling system having a lime kiln with an inlet adapted to receive lime mud, apply heat thereto, process the lime mud into lime in granular form and discharge the granular lime to a kiln outlet and a lime mud feed system adapted to wash, filter and feed lime mud to the lime mud inlet of the kiln, wherein the improvement comprises a camera proximate the kiln outlet imaging granular lime and providing outlet images of granular lime exiting the kiln, a processor analyzing the outlet images of the granular lime and providing pebble size distributions for granular lime exiting the kiln, as well as a controller communicating with the processor comparing pebble size distributions of granular lime exiting the kiln with predetermined prescribed operating parameters for the pebble size distribution for the granular lime exiting the kiln and issuing (I) a notification and/or (II) a control signal prompting remedial action when the pebble size distributions for the granular lime exiting the kiln is outside of the predetermined prescribed operating parameters for pebble size distributions for granular lime exiting the kiln.

Embodiment No. 3 is a method of processing a calcium carbonate slurry to reburned lime in a lime kiln while controlling kiln ringing and ball formation comprising: (a) providing a lime kiln with a calcium carbonate slurry inlet and a reburned lime outlet; (b) disposing a camera proximate the reburned lime outlet of the kiln; (c) feeding a calcium carbonate slurry from a feed system to the calcium carbonate slurry inlet of the kiln; (d) heating the calcium carbonate slurry in the kiln to convert calcium carbonate to lime in granular form while advancing the feed toward the reburned lime outlet of the kiln where the lime in granular form exits the kiln; (e) imaging the lime in granular form proximate the reburned lime outlet of the lime kiln to provide outlet images of lime in granular form exiting the kiln; (f) analyzing the outlet images of lime in granular form to provide pebble size distributions for granular lime exiting the kiln; (g) comparing the pebble size distributions of the granular lime exiting the kiln with predetermined prescribed operating parameters for pebble size distributions for granular lime exiting the kiln; (h) issuing (I) a notification and/or (II) a control signal when the pebble size distributions for granular lime exiting the kiln is outside of the predetermined prescribed operating parameters for the pebble size distribution for the granular lime exiting the kiln; and (i) undertaking remedial action to ameliorate lime kiln ringing and ball formation by adjusting one or more lime kiln parameters or feed parameters based on the notification or control signal provided.

In any embodiment, the predetermined prescribed operating parameters comprise size distribution values for the pebble size distribution of granular lime exiting the kiln, for example, size distribution values for the pebble size distribution of granular lime exiting the kiln may require that 90% by weight or more of granulated lime exiting the kiln has a pebble size of less than 30 mm. Likewise, the predetermined prescribed operating parameters may comprise rate values corresponding to changes in size distribution values for pebble size distributions of granular lime exiting the kiln, for example, rate values corresponding to changes in size distribution values for pebble size distributions of granular lime exiting the kiln may require that the increases in the rate of formation of pebbles having a pebble size of 30 mm or more are below a threshold value of 1% by weight additional pebbles having a pebble size of 30 mm or more per 24 hours.

In any embodiment, the system, improvement or method may include practicing the invention such that the controller issues notifications with remedial instructions for adjusting one or more kiln parameters or one or more feed parameters when the pebble size distribution of the granular lime exiting the kiln is outside of the predetermined prescribed operating parameters for granular lime exiting the kiln or paracticing the invention such that the controller automatically issues control signals to the kiln or the lime mud feed system for taking remedial action to adjust one or more kiln parameters or one or more feed parameters when the pebble size distribution of the granular line exiting the kiln is outside the prescribed operating parameters for granular lime exiting the kiln, such as wherein the controller automatically issues control signals to the kiln to take remedial actions to adjust kiln temperature or wherein the lime kiln is a rotary kiln and the controller automatically issues control signals to the kiln to take remedial action to adjust rotational speed of the kiln or wherein the controller automatically issues control signals to the lime mud feed system to take remedial actions to adjust one or more of: (I) feed rate of lime mud to the kiln; (II) consistency of the lime mud fed to the kiln; or (III) impurity levels in the lime mud fed to the kiln.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of illustration only and is not intended to limit the invention.

What is claimed is:

1. A system for recycling lime mud having closed loop control for ameliorating kiln ringing and ball formation with camera detection of pebble size comprising:
　(a) a lime kiln with a lime mud inlet, a reburned lime outlet and a burner to heat the kiln;
　(b) a lime mud feed system adapted to wash, filter and feed lime mud to the lime mud inlet of the kiln,
the kiln being adapted to heat the lime mud and convert the lime mud to lime in granular form while advancing the feed toward the reburned lime outlet of the kiln where lime in granular form exits the kiln;
　(c) a camera adapted to image the lime in granular form proximate the reburned lime outlet of the kiln to provide in situ outlet images of lime in granular form inside the kiln proximate the reburned lime outlet of the kiln;

(d) an analyzer coupled with the camera adapted to analyze the in situ outlet images of the lime in granular form inside the kiln proximate the reburned lime outlet of the kiln to provide pebble size distributions for the granular lime exiting the kiln; and (e) a controller communicating with the analyzer operative to: (I) compare the pebble size distributions of the granular lime inside the kiln proximate the reburned lime outlet of the kiln with predetermined prescribed operating parameters for pebble size distributions of granular lime exiting the kiln and (II) issue a notification and/or a control signal when the pebble size distributions of granular lime inside the kiln proximate the reburned lime outlet of the kiln are outside of the predetermined prescribed operating parameters for pebble size distributions for granular lime exiting the kiln, wherein the camera adapted to image the lime in granular form proximate the reburned lime outlet of the kiln to provide in situ outlet images of lime in granular form as it exits the kiln is adjustably disposed a distance from 0.5-2 feet (0.15-0.6 m) from the kiln outlet to image the lime anywhere from 1-25 ft (0.3-7.6 m) inside of the kiln.

2. The system for recycling lime mud having closed loop control for ameliorating kiln ringing and ball formation with camera detection of pebble size according to claim 1, wherein the predetermined prescribed operating parameters comprise size distribution values for the pebble size distributions of granular lime exiting the kiln.

3. The system for recycling lime mud having closed loop control for ameliorating kiln ringing and ball formation with camera detection of pebble size according to claim 2, wherein the size distribution values for the pebble size distributions of granular lime exiting the kiln require that 90% by weight or more of granulated lime exiting the kiln has a pebble size of less than 30 mm.

4. The system for recycling lime mud having closed loop control for ameliorating kiln ringing and ball formation with camera detection of pebble size according to claim 1, wherein the predetermined prescribed operating parameters comprise rate values corresponding to changes in size distribution values for pebble size distributions of granular lime exiting the kiln.

5. The system for recycling lime mud having closed loop control for ameliorating kiln ringing and ball formation with camera detection of pebble size according to claim 4, wherein the rate values corresponding to changes in size distribution values for pebble size distributions of granular lime exiting the kiln require that the increases in the rate of formation of pebbles having a pebble size of 30 mm or more are below a threshold value of 1% by weight additional pebbles having a pebble size of 30 mm or more per 24 hours.

6. The system for recycling lime mud having closed loop control for ameliorating kiln ringing and ball formation with camera detection of pebble size according to claim 1, operated such that the controller issues notifications with remedial instructions for adjusting one or more kiln parameters or one or more feed parameters when the pebble size distribution of the granular lime inside the kiln proximate the reburned lime outlet of the kiln is outside of the predetermined prescribed operating parameters for granular lime exiting the kiln.

7. The system for recycling lime mud having closed loop control for ameliorating kiln ringing and ball formation with camera detection of pebble size according to claim 1, operated such that the controller automatically issues control signals to the kiln or the lime mud feed system for taking remedial action to adjust one or more kiln parameters or one or more feed parameters when the pebble size distribution of the granular lime inside the kiln proximate the reburned lime outlet of the kiln is outside the prescribed operating parameters for granular lime exiting the kiln.

8. The system for recycling lime mud having closed loop control for ameliorating kiln ringing and ball formation with camera detection of pebble size according to claim 7, wherein the controller automatically issues control signals to the kiln to take remedial actions to adjust kiln temperature.

9. The system for recycling lime mud having closed loop control for ameliorating kiln ringing and ball formation with camera detection of pebble size according to claim 7, wherein the lime kiln is a rotary kiln and the controller automatically issues control signals to the kiln to take remedial action to adjust rotational speed of the kiln.

10. The system for recycling lime mud having closed loop control for ameliorating kiln ringing and ball formation with camera detection of pebble size according to claim 7, wherein the controller automatically issues control signals to the lime mud feed system to take remedial actions to adjust one or more of: (I) feed rate of lime mud to the kiln; (II) consistency of the lime mud fed to the kiln; or (III) impurity levels in the lime mud fed to the kiln.

\* \* \* \* \*